(No Model.)
S. P. GRAHAM.
LAWN MOWER.
No. 597,972. Patented Jan. 25, 1898.
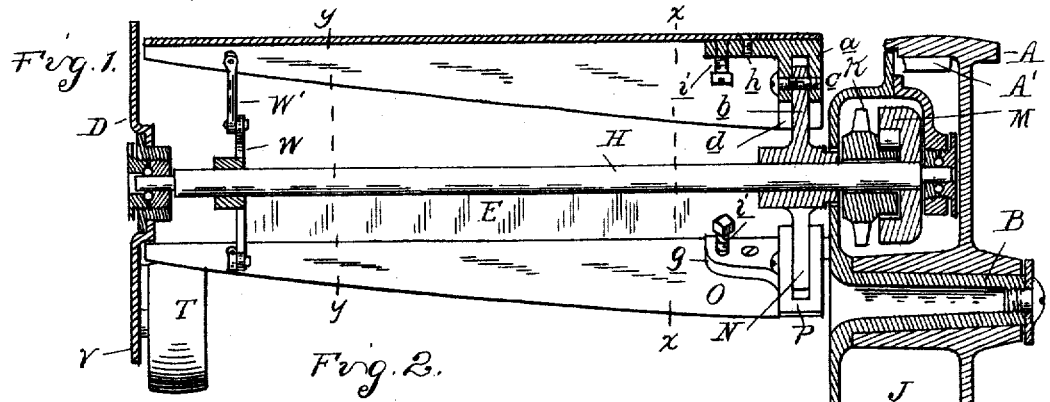
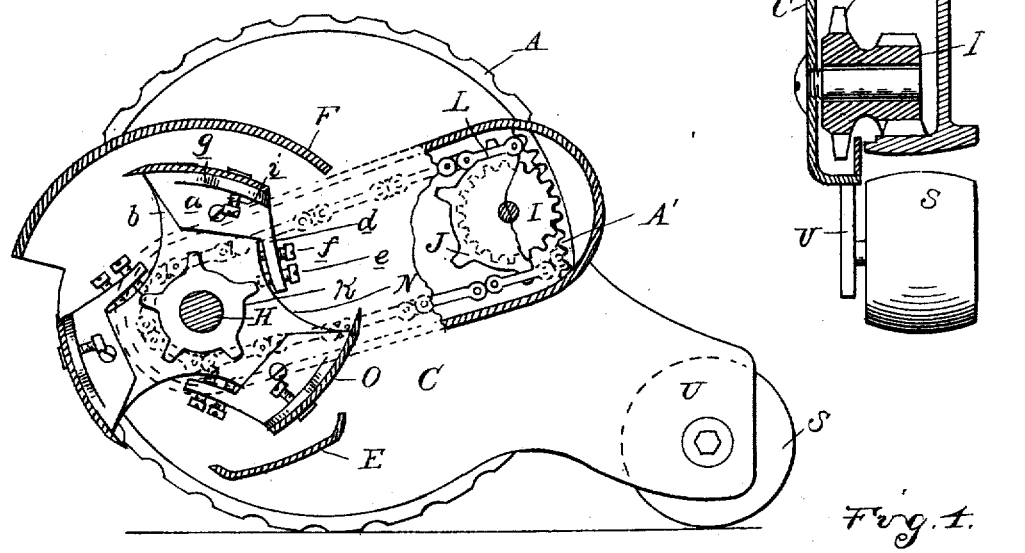
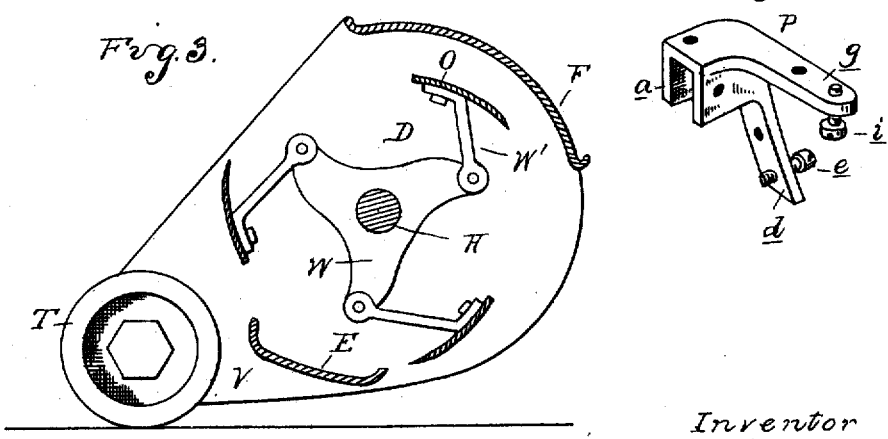
Inventor
Simon P. Graham
By Thos. S. Sprague & Son
Attys.
Witnesses

UNITED STATES PATENT OFFICE.

SIMON P. GRAHAM, OF DETROIT, MICHIGAN, ASSIGNOR TO THE PASTIME LAWN MOWER COMPANY, OF SAME PLACE.

LAWN-MOWER.

SPECIFICATION forming part of Letters Patent No. 597,972, dated January 25, 1898.

Application filed March 29, 1897. Serial No. 629,757. (No model.)

*To all whom it may concern:*

Be it known that I, SIMON P. GRAHAM, a citizen of the United States, residing at Detroit, in the county of Wayne and State of Michigan, have invented certain new and useful Improvements in Lawn-Mowers, of which the following is a specification, reference being had therein to the accompanying drawings.

My invention relates to mowers of that class in which are employed a stationary cutter-bar or abutment and a rotary cutter, and particularly to such of said mowers generally known as "trimmers," which are adapted to be used for cutting the grass close to the side of an obstruction, such as a building or fence.

The objects of my invention are to produce a construction in which the proper relation of the rotary cutter to the stationary cutter-bar or abutment is automatically effected and to obtain a mower which will not become clogged in working.

A further object is to make the knives readily detachable and attachable, so that they can be quickly taken off as necessary for grinding and as quickly replaced.

The invention consists, primarily, in a mower of a construction in which the rotary cutter-head carries a blade which is permitted a free movement to effect an automatic adjustment thereof relative to the stationary cutter-bar or abutment.

It further consists of a construction comprising a stationary cutter-bar or abutment, a rotary cutter-head, and knives carried by the rotary head and free to move to automatically adjust themselves to the stationary cutter-bar or abutment.

The invention further consists in the peculiar construction, arrangement of parts, and combinations thereof hereinafter particularly set forth and claimed.

In the drawings, Figure 1 is a sectional plan view of my mower. Fig. 2 is a cross-section therethrough on line $x\,x$, looking toward the right. Fig. 3 is a cross-section on line $y\,y$, looking toward the left. Fig. 4 is a perspective view of the knife-holder for the rotary cutter detached.

A is a ground-wheel which is journaled on the stub-axle B, projecting from the casing C, which forms a housing for the side of the wheel and one side of the mower-frame.

D is a disk forming the other side of the mower, which is connected to the casing C by the stationary cutter-bar E and the stay F, the latter being preferably in the form of a cylindrical segment and forming also a guard for the cutter.

H is the cutter-shaft, journaled at its opposite ends in side casings C and D and driven from the ground-wheel A, which is provided with an internal gear A', meshing with the pinion I. This pinion may be placed directly upon the shaft H; but in order to obtain a greater speed without diminishing the size of the pinion and also to be enabled to place the shaft nearer the center of the wheel I preferably place the pinion at the rear of the housing and connect it to the shaft by the sprockets J K and chain L. The sprocket K is sleeved upon the shaft H and drives the latter through the medium of a clutch M of any suitable construction.

N is a head secured to the shaft H beside the casing C, to which are secured the knives O, extending across the frame and unsupported at their opposite ends. The knives are preferably formed of spring-steel, being slightly concavo-convex in cross-section and tapered toward their free ends, the cutting edge inclining backward. They are preferably attached to the head N by means of the detachable holders P, which are of the following construction: $a$ are separated ears on the holder embracing the arm $b$ of the head N and pivoted thereto by means of the screw $c$. $d$ is an arm on the holder projecting down beside the arm $b$. $e$ and $f$ are adjusting-screws for the arm $d$, the former engaging with a screw-threaded aperture in the arm $b$ and serving to clamp down the arm $d$, while the set-screw $f$ acts as an adjustable stop for changing the position of the arm $d$. $g$ is an arm projecting laterally from the holder and forming a bearing for the knife-blade O, which is secured thereto by the screws $h$, and $i$ is a set-screw engaging with a screw-threaded aperture in the arm $g$ and bearing against the under side of the knife-blade and adapted to determine the proper position of the free end of the cutter-blade relative to the stationary cutter-bar.

S and T are ground-rolls journaled upon stub-shafts secured to rearwardly-extending ears U and V on the side casing C and D, respectively.

A suitable handle (not shown) is secured to the frame, preferably to the stay F.

In operation the knives are secured to the head and adjusted by means of the screws $e$, $f$, $h$, and $i$, so as to come into the proper relation to the stationary knife-bar E, no adjustment therefore being required for the latter. The knives are preferably adjusted to a position where they pass in close proximity to the stationary knife-bar and yet do not touch it. When the mower is put in motion, the centrifugal action will keep the blades O always close to the stationary blade, and as the point of attachment of the movable blades is in advance of their free ends there is no danger of catching on the stationary blade by reason of being thrown out too far at the same time a drawing cut is made across the entire length of the bar. This will cause the mower to make a clean cut, as the knives are always in close contact at all points in the cut and at the same time will permit the knives to spring inward to avoid a stick or other obstruction which may be caught up by the mower.

I preferably also provide a draft connection for the free ends of the blades which does not interfere with their free radial movement, such as the spider W, having an arm connected to each of the blades by the pivoted links W'.

The knives O may be quickly detached at any time for grinding by unfastening the screws $c$ and $e$, and may be replaced again without altering the adjustment, which is determined by the position of the screws $f$ and $i$.

What I claim as my invention is—

1. In a mower, the combination with the stationary cutter-bar or abutment, of a rotary cutter-head, a blade secured thereto free to move outwardly to automatically adjust itself to the stationary cutter-bar.

2. In a mower, the combination with the stationary cutter-bar, of a rotary cutter-head having blades secured thereto at one end, the other end being free to move radially.

3. In a mower, the combination with the stationary cutter-bar, of a rotary cutter-head, and blades detachably and independently adjustably secured to said cutter-head at one end, the other end being free to move radially.

4. In a mower, the combination with the stationary cutter-bar, of the rotary cutter-head N having the radial arms $b$, the holders P having the separated ears $a$ embracing said arms $c$ and detachably pivoted thereto, the arm $d$ on said holder extending beside the arm $b$, the clamping and adjusting screws $e$ and $f$ therefor, the blade O and the clamping and adjusting screws $h$ and $i$ for securing said blade at one end to said holder.

5. In a mower, the combination of a stationary cutter-bar or abutment, a rotary shaft, mechanism for driving the latter, a head on said shaft adjacent one end thereof, cutter-blades secured to said head, a spider on the shaft, and links connected to the cutter-blades and pivotally connected to the spider.

In testimony whereof I affix my signature in presence of two witnesses.

SIMON P. GRAHAM.

Witnesses:
M. B. O'DOGHERTY,
OTTO F. BARTHEL.